US006587288B2

(12) United States Patent
Erz et al.

(10) Patent No.: US 6,587,288 B2
(45) Date of Patent: Jul. 1, 2003

(54) OPTICAL ATTENUATION FILTER

(75) Inventors: Ralf H. Erz, Santa Rosa, CA (US);
Scott McEldowney, Windsor, CA (US);
Lauren R. Wendt, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/805,412

(22) Filed: Mar. 12, 2001

(65) Prior Publication Data

US 2002/0176183 A1 Nov. 28, 2002

(51) Int. Cl.⁷ .............................. G02B 5/22; G02B 1/10; G02B 6/00
(52) U.S. Cl. ..................... 359/885; 359/586; 385/140
(58) Field of Search .......................... 359/885, 888, 359/359, 360, 580, 586; 385/140, 141

(56) References Cited

U.S. PATENT DOCUMENTS

| 5,337,191 A | * | 8/1994 | Austin ........................ 359/359 |
| 5,920,431 A | * | 7/1999 | Tokuhiro et al. ........... 359/586 |
| 6,292,616 B1 | * | 9/2001 | Tei et al. ..................... 385/140 |
| 2002/0061179 A1 | * | 5/2002 | Morimoto et al. .......... 385/140 |

* cited by examiner

*Primary Examiner*—Audrey Chang
(74) *Attorney, Agent, or Firm*—Allen, Dyer, Doppelt, Milbrath & Gilchrist, P.A.

(57) ABSTRACT

An attenuation filter contains absorbing thin film layers, which comprise gray metals or metal compounds. The attenuation filter offers significant advantages when used in optical communication systems subjected to a relatively high flux of incident light. It was surprisingly discovered that particular thin film materials provide significant protection to the attenuating thin film layer thereby improving the temporal stability and power handling capacity over prior art devices.

19 Claims, 4 Drawing Sheets

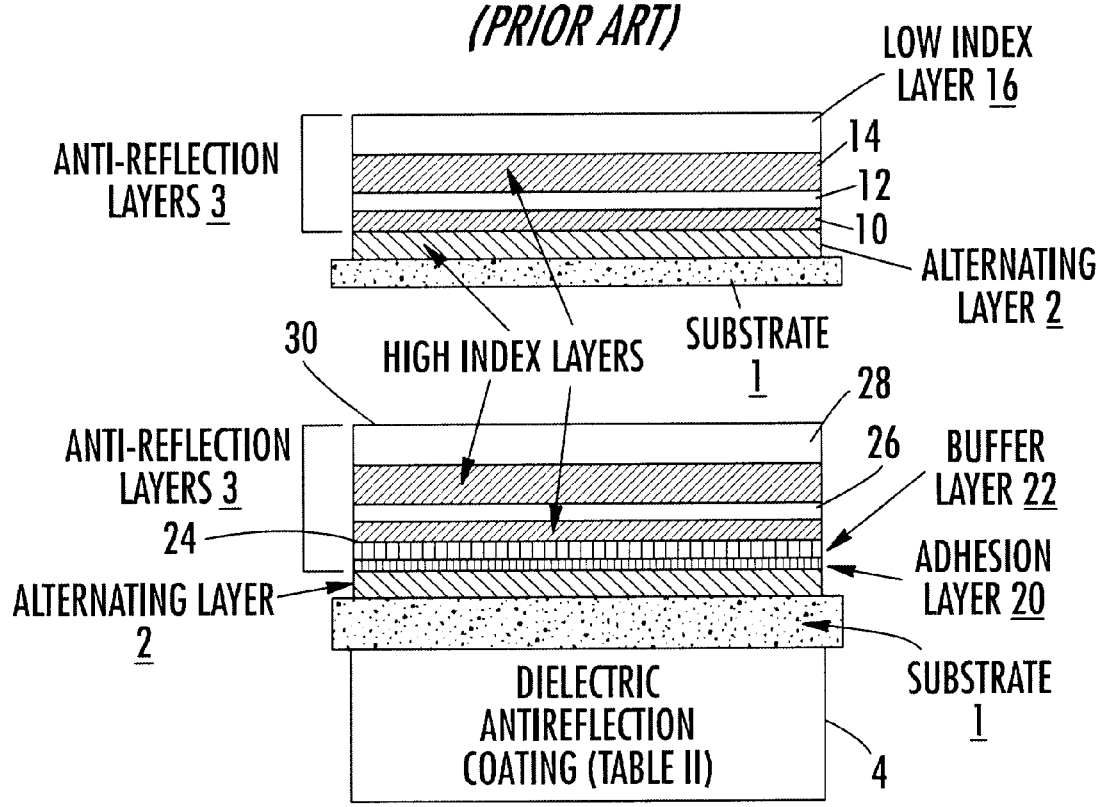

OPTICAL ATTENUATION FILTER

BACKGROUND OF INVENTION

In an optical communication system, optical signals may be transmitted in free space, but are generally transmitted over optical waveguides, typically optical fibers. Since optical fiber transmission offers tremendous bandwidth and transmission rate advances over the transmission of electrical signals, conversion to electrical signals are avoided as much as possible by active optical processing such as optical amplification, switching and routing. It is usually desirable to avoid conversion of the signals to electrical signal until they reach the target destination, where they are converted back to electrical signals representing digital data, voice or images in various analog formats.

In order to maximize the capacity of fiber optic communication systems many signal are simultaneously transmitted over the same fiber waveguides in a scheme known as wavelength division multiplexing or WDM. In WDM each discrete signal may correspond to a different wavelength of light, known as an optical channel. Various non-linear properties of optical glass, active and passive components in the optical system produce cross talk between the WDM optical signal channels. This "cross talk" is insignificant if the signal to noise ratio is high and the power levels of all optical channels are comparable.

The optical devices and interconnections in any route will result in signal losses, thus the signal power and signal to noise ratio of any optical signal can be expected to vary with the routing path. When the communication system is a network, optical channels are combined and routed together in common waveguides with signals from different sources, the power levels in each optical channels are likely to be different, in which case the "cross-talk" from the stronger channels will degrade the signal to noise ration in the weaker channels.

Degradation is avoiding by balancing signal power, such as by selectively attenuating the stronger signals. The level of attenuation may need to be varied as a network is modified, expanded or actively modified so as to accommodate the variation in communication traffic that can be expected with customer use and demand.

Thin film optical filters may be used to attenuate such optical signals. A thin film filter comprises one or more layers of material, each layer pre-selected for its optical properties, at a specific thickness to provide spectral control by interference phenomena arising from the interaction of light reflecting off the multiple thin film layers and/or absorption of energy by the thin film material.

Optical filters which utilize the inherent optical absorption of thin film materials are simpler in construction and avoid the characteristic reflected signal of an interference based filter, which must be managed to avoid cross talk or feedback to semiconductor lasers in the optical system. Although interference filter require more layers, they can be fabricated from dielectric materials having high stability to both environmental cycling of temperature and humidity as well as exposure to high optical powers.

Since an optical communications system must be highly reliable, yet adapted to variations in customer demand and utilization patterns, the ideal attenuation filter provides a reliably stable level of attenuation, preferably with a minimum attenuation variation, over all the signal channels in the WDM system.

Accordingly, it is an object of the present invention to provide an attenuating filter for optical communications systems that is stable over many years of use and provides uniform attenuation over a very broad wavelength range in a WDM system.

It is an additional object of the present invention to provide an attenuating filter and a method of adjusting the attenuation levels without sacrificing the uniform attenuation or low reflectivity a very broad wavelength range in a WDM system.

It is an additional object of the present invention to provide an attenuating filter and a method of adjusting the attenuation levels without sacrificing the uniform attenuation or low reflectivity a very broad wavelength range in a WDM system.

SUMMARY OF INVENTION

The attenuating filter provides both low reflectivity and uniform attenuation over the telecommunications C and L bands. The filter comprises a substrate, an attenuating coating deposited on at least a portion of the first surface of the substrate, a buffer coating deposited after the attenuating coating and has additional thin film layers to protect the attenuating coating from the environment and act as an antireflection coating on the clear locations on the substrate.

The attenuating filter preferably has a second antireflection coating deposited on the second surface of the substrate such that the reflectivity on the second surface of the attenuating filter is less than about 0.1 percent.

We have discovered that the appropriate selection of buffer layer and its incorporation within the antireflection coating design provides both the desired spectral control characteristics, but also has enhanced stability and resistance to degradation at high levels of incident light utilized in an optical telecommunications system.

These and other features, aspects, and advantages of the present invention will become better understood with reference to the following description and appended claims.

BRIEF DESCRIPTION OF DRAWINGS

FIG. 1 schematically illustrates the cross-section of a conventional attenuating filter.

FIG. 2 schematically illustrates the cross-section of one embodiment of the attenuating filter of the instant invention.

DETAILED DESCRIPTION

Figure 3:
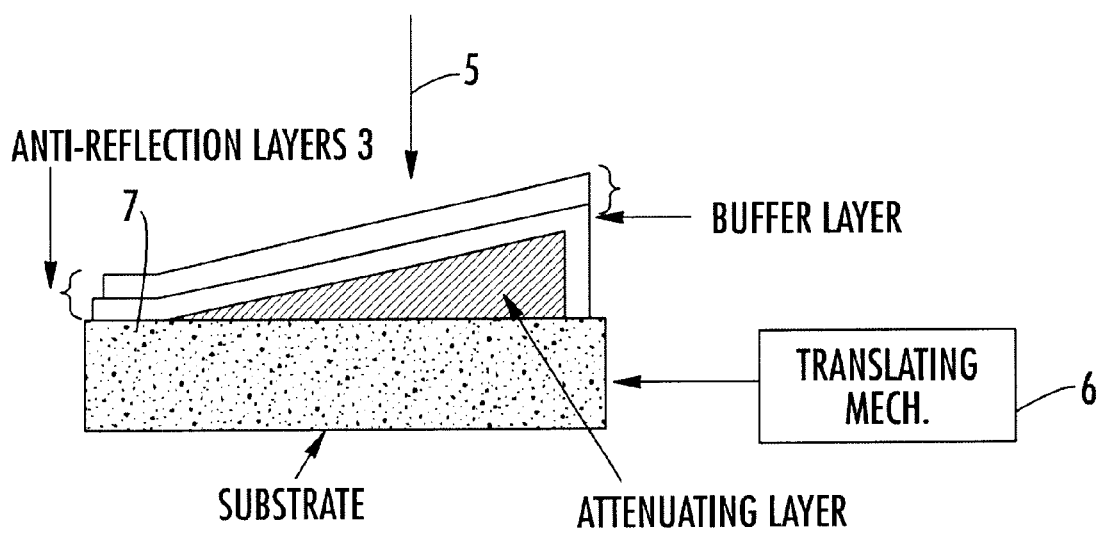
FIG. 3 schematically illustrates the cross-section of another embodiment of the inventiont where the attenuating layer thickness varies spatially across the surface of the filter.
Figure 4:
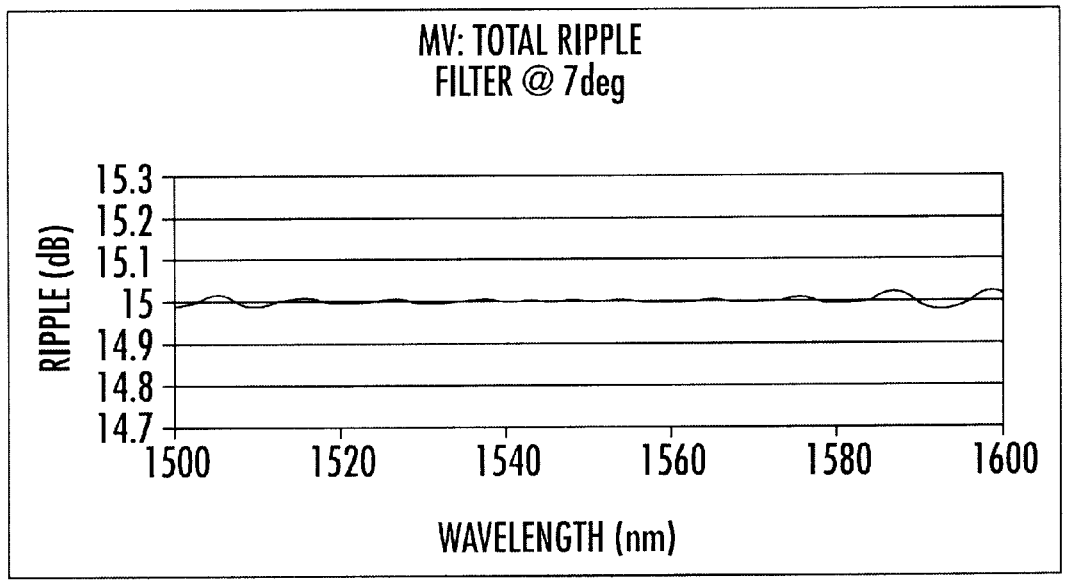
FIG. 4 is a graph plotting the attenuation of the inventive filter as a function of wavelength.

FIG. 1 schematically illustrates a cross-section of a conventional attenuating filter. A thin film of metal 2 is deposited on an optically transparent substrate 1 at a thickness sufficient to produce the desired signal attenuation level by absorption of the incident radiation. Since metals are typically soft and can degrade in a typical operating environment, it is desirable to apply a protective layer over the metal. In cases where the film has a graded thickness as shown in FIG. 3, an anti-reflection coating 3 is applied to minimize the reflectivity from the un-coated section of the substrate. A conventional dielectric anti-reflection coating comprises one or more layers of the dielectric material having a thickness on the order of ¼ wavelength of the incident radiation intended to be reduced. In order to achieve low reflection over a broader range of wavelengths, the entire anti-reflection coating may consist of multiple layers of dielectric material, the materials characterized, by one material having a lower refractive index than the other material, which in the case of two dielectric materials is simply referred to as a high index material layer.

FIG. 1 follows the conventional teaching of optical thin film design that the high index layer 10 is deposited on the metal layer 2, followed by a low index layer 12, followed by a second high index layer 14 and terminating with a low index layer 16; wherein the optical thickness of each high and low index material is adjusted to minimize the reflection at the desired wavelengths.

We have discovered the performance attributes useful in an optical communication system are significantly improved by taking the opposite approach; depositing or placing the low reflective index layer on or proximate to the metallic layer.

In a preferred embodiment of the invention, schematically illustrated in FIG. 2, the materials and thickness correspond to the layers set forth in Table I. In this embodiment the dielectric thin film coatings can be characterized as an adhesion layer 20 of any intermediate refractive index material (aluminum oxide) deposited on the metal layer 2 ("INCONEL 600"), followed by the lower refractive index material (silicon dioxide) 22 deposited on the intermediate refractive index material 20, followed by a high refractive index material (tantalum oxide) 24, followed by a second low refractive index material (magnesium fluoride) 26 having a lower refractive index than silicon dioxide. FIG. 2 shows a further high index layer 28, such as $Ta_2O_5$, formed on low index layer 26, and another low index layer 30, such as $MgF_2$, formed on layer 28, as listed in Table I below.

stability of the attenuating material advantageously provides consistent attenuation level over the entire useful wavelength range, potentially minimizing the likelyhood of failure and device replacement for a period of many decades.

While the buffer layer is preferably an oxide of silicon, such as silicon monoxide, silicon dioxide, SiOx (wherein x is less than 2) and the like, other low refractive index compounds are also suitable, such as aluminum oxide, or mixtures of such compounds with oxides of silicon.

Accordingly, the low refractive index materials used in the construction of the dielectric anti-reflection coating, need not be limited to the combination of silicon dioxide and magnesium fluoride a shown in FIG. 2 and table I, but may include other relatively lower attractive index materials such as, aluminum oxide and the like, in varying combinations were any of these materials might be substituted for one or more of the multiple low refractive index layers.

The attenuating coating need not be limited to Inconel type alloys of nickel, but may comprise, nickel, chromium, tungsten, copper, gold, tantalum, iron and mixtures, alloys, or compounds thereof. Accordingly, the thickness of the attenuating layer would be adjusted correspondingly depending on the attenuation level sought to be achieved and the optical absorption characteristics of the attenuating coating.

Additionally, the high refractive index material utilized in the entire reflection coating need not be limited to a single material or tantalum oxide, but may utilize other relatively high refractive index optical coating materials for one or more of the high refractive index layers, such as hafnium oxide, niobium oxide titanium dioxide and the like.

Aluminum oxide is the currently preferred adhesion promoting layer for use in combination with the preferred attenuating layer materials, "INCONEL 600" alloy and silicon oxide buffer layer. Alternative adhesion promoting

TABLE I

| Material | Optical Thickness (4nd), nm | Physical Thickness (d), nm | Refractive Index (n) at 1550 nm |
|---|---|---|---|
| Substrate (BK7 glass) | — | | 1.48 |
| "Inconel 600" | not applicable | from 0 to 100 nm | n = 4.32, k = 6.4 |
| $Al_2O_3$ | 50 | 8 | 1.65 |
| $SiO_2$ | 1490 | 258 | 1.444 |
| $Ta_2O_5$ | 472 | 56 | 2.12 |
| $SiO_2$ | 849 | 145 | 1.444 |
| $Ta_2O_5$ | 1007 | 119 | 2.12 |
| $MgF_2$ | 1788.2 | 324 | 1.38 |

Figure 5:
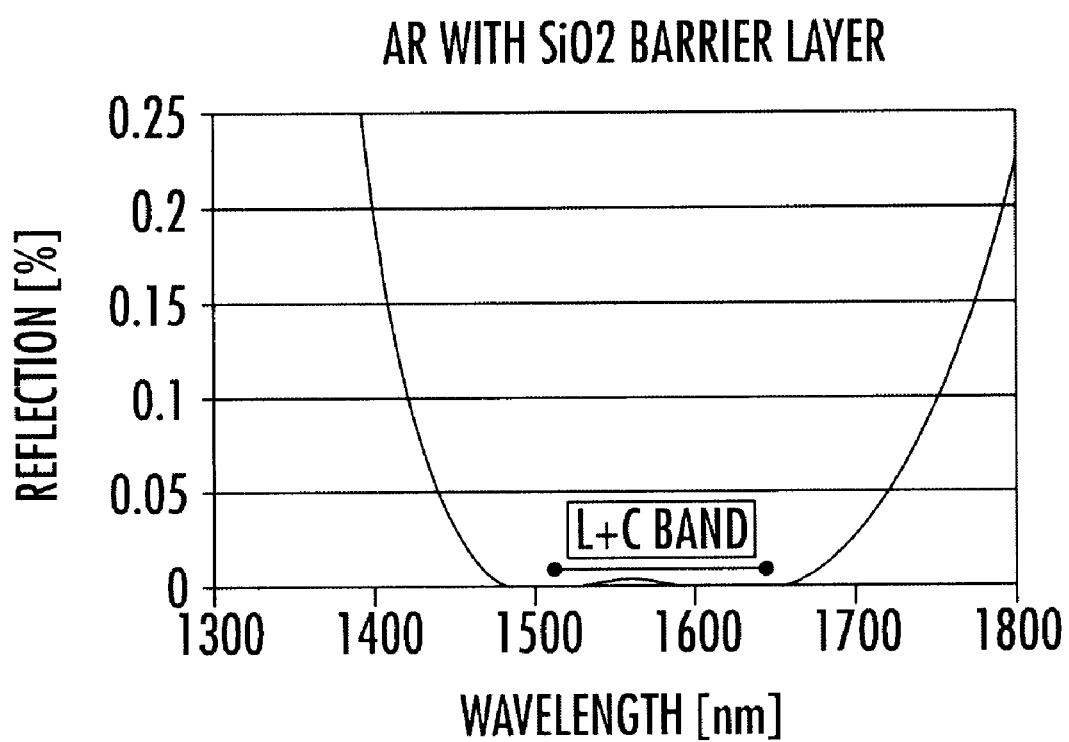
FIG. 5 is a graph plotting the reflectivity of the second surface of the inventive filter as a function of wavelength.

The use of two low refractive index materials, silicon dioxide and magnesium fluoride, was found to increase the wavelength range of the low reflectivity region such that the attenuating filter is suitable for both the telecommunication C and L bands. FIG. 5 illustrates the reflectivity of this surface as a function of wavelength. This particular design results a reflectivity of less than about 0.001 percent from between about 1472 to about 1660 nm. Similar coating designs using only silicon dioxide or magnesium fluoride will produce similar results.

Not wishing to be bound by theory, we believe a preferred layer for proximate contact or coverage of the attenuating layer of the filter is an oxide of silicon. The low index layer of an oxide of silica appears to provide a protective or buffering function such that thermo-oxidative degradations of the underlying attenuating layer is substantially reduced. In the context of an optical communication system, this layers are as chromium, tantalum oxide, nickel oxide and zirconium oxide and other oxides of metals, which might be selected depending on the attenuating layer the level of adhesion required with a particular buffer layer in the application. Alternatively the substrate can be glass, fused silica and silicon and the like.

Any or all of the coating layers in the filter can be made by various methods of physical and chemical vapor deposition known to one of ordinary skill in the art of optical coating technology, including but not limited to, thermal evaporation, electron beam evaporation, ion assisted deposition, sputtering or chemical vapor deposition. However, it would be expected that the stability of the attenuating layer may still exhibit a relation to the composition of the attenuating layer and its inherent stability as well as film quality inherent in process used to produce the attenuating layer and the subsequently deposited layers in the filter construction.

Since a further objective of the invention is to minimize the total reflection from the attenuating filter, as further shown in FIG. 2, the second surface of the substrate is preferably coated with an additional dielectric anti-reflection coating 4 also having broad low reflection region as that illustrated in FIG. 5. Table II, below, provides details on the materials, design and construction of the additional anti-reflection coating 4 on the second surface of the substrate.

TABLE II

| Material | Optical Thickness (4nd), nm | Physical Thickness (d), nm | Refractive Index (n), nm at 1550 nm |
|---|---|---|---|
| Substrate (BK7 glass) | — | | 1.52 |
| $Al_2O_3$ | 50 | 8 | 1.65 |
| $SiO_2$ | 1490 | 258 | 1.444 |
| $Ta_2O_5$ | 472 | 56 | 2.12 |
| $SiO_2$ | 849 | 145 | 1.444 |
| $Ta_2O_5$ | 1007 | 119 | 2.12 |
| $MgF_2$ | 1788.2 | 324 | 1.38 |

Variable Attenuating Filter

In a more preferred embodiment of the invention, the attenuating coating has a thickness variation across at least one dimension of the substrate, as shown in FIG. 3, such that the incident optical signal 5 can be selectively attenuated by translating the attenuating filter parallel to the plane of the first surface of the substrate, as by way of a translating mechanism 6, such that the incident signal is intersected by a thicker or thinner portion of the attenuating coating to produce or tune the desired level of signal attenuation.

Various methods of making filters having a variation in thickness of one or more layers, such as linearly or circular variable filters and alike, are known to those ordinary skill in the art of optical coating technology. For example U.S. Pat. No. 3,442,572, entitled Circularly Variable filter (Illsley, et al.) and U.S. Pat. No. 3,617,331, entitled Method for Manufacture of Rotatable Variable Filter (Illsley et al.), the disclosures of which are incorporated herein by reference, teach various methods of manufacturing linearly variable filters by physical vapor deposition. U.S. Pat. No. 5,993,904, entitled Three-dimensional masking method for control of coating thickness, which is incorporated herein by reference, discloses chemical vapor deposition methods for producing and thin film coating having a controlled thickness distribution of various two-dimensional gradients.

Furthermore, the attenuation filter of the instant invention can be deployed within an optical communications system and adapted for either variable translation, to achieve various levels of attenuation in the case of filter having a spatial thickness variation in the attenuating layer, or discrete translation. Representative mechanical apparatus and optical systems for such uses are described in U.S. Pat. No. 5,506,731, entitled Device for Controllably Moving an Optical Element (Smiley) and U.S. Pat. No. 5,745,634, entitled Voltage Controlled Attenuator (Garret et al.), which are both incorporated herein by reference.

In many cases it may be desirable to be able to adjust the attenuation level from a minimum value near zero, limited only by the absorption inherent in the substrate and antireflection layers, to some greater value. Although this can be accomplished by completely removing the attenuating filter from the beam path, this may hinder achieving complete alignment when the attenuating filter is re-inserted into the beam path.

The attenuating filter in FIG. 3 has a region 7 on the substrate devoid of an attenuating layer, there by enabling a continuous attenuation range downward from substantially 100% transmission without removal of the filter from the optical path. This region 7 is formed by masking the area prior to depositing the attenuating layer deposition, which is removed before the buffer layer is deposited.

In the conventional design in FIG. 1 a high transmission coating free area can only be defined by removing the mask from substrate after depositing all the coating layers as these layer would decrease the total transmission by increasing the reflectivity of the reflecting layer for the substrate. Stripping the mask however also exposes the metal attenuating layer, making it more vulnerable to oxidation and degradation of optical performance. In contrast when the buffer layer and the substrate have substantially the same refractive index, such as with $SiO2$ and glass, the buffer layer surrounds and covers the attenuating layer entirely, thus avoiding the exposed edges that would result from a conventional design.

Stability

The stability of the inventive filter was compared to conventional filters using a high powered laser (up to about 250 mW) to accelerate the test, with the failure criteria of 0.5 dB increase in attenuation. The failure rate at high power levels provide an estimate of a power acceleration factor, which provides an comparative estimate of the failure rates of interest at the lower power levels more typically encountered in optical telecommunication systems. It was not practical to characterize the filter stability under standard operating conditions of 50 and 100 mW as this would require decades of testing.

Methods of testing are disclosed in IEC 62005-2, Committee draft 86B/1176/CD 1998-12: Example of quantitative assessment of reliability based on accelerated aging test-Part 2a: Temperature and humidity; steady state, which is incorporated herein by reference.

Samples corresponding to the filter in Table I were exposed to optical powers of 150, 200 and 250 mW using a 1550 nm laser source During this exposure the optical transmission was measured over time so that a time to failure (TTF), defined as a 0.5 dB decrease in optical attenuation, could be determined at each power level. When the change in transmission over was linear with time the TTF was determined by extrapolation to 0.5 dB. The time for 50% of the sample population to fail was determined by fitting TTF data set to a log-normal distribution of y as a linear function of x, to determine the Median Time to Failure (MTF):

$$y=x\sigma+\ln(MTF) \quad \text{(equation 1)}$$

wherein σ=dispersion parameter.

A power acceleration factor for each filter type was determined by the Arrhenius activation energy model for degradation, according to equation 2:

$$R=Ro\exp(Ea/KT) \quad \text{(equation 2)}$$

Where R=failure rate; Ro=constant; K=Boltzmann's constant (8.61×10−5 eV); T=Temperature (in Kelvin) and Ea=Activation energy, in eV.

Plotting the MTF against the reciprocal of the temperature in Kelvin confirmed the premise that the dominant mechanism is thermo-oxidation of the attenuating material, as it revealed the linear relationship between (1/T) and (Ea/k). Extrapolated to lower power levels predicted an MTF (0.5 dB increase in attenuation at 50 mW power) of 41.7 years for the novel filter design illustrated in FIG. 2 (corresponding to Table I), vs. 35.9 years for a filter corresponding to the conventional design described FIG. 1.

We claim:

1. An optical attenuation filter comprising:
   a substrate having a first surface and a second surface;
   an optical attenuating layer formed on a first portion of said first surface of said substrate, wherein said optical attenuating layer has a variation in thickness across at least one dimension of said substrate, and wherein said first surface of said substrate has a second portion thereof, that is adjacent to said first portion of said first surface said substrate and is exclusive of said optical attenuating layer; and
   a first multilayer antireflective coating structure formed on said optical attenuating layer and also on said second portion of said first surface of said substrate, and including a first buffer layer of a refractive index less than 1.65, and one or more additional layers containing at least one layer of a refractive index greater than 1.65, and wherein said first multilayer antireflective coating structure formed on said optical attenuating layer and on said second portion of said first surface of said substrate has a layer arrangement such that said first buffer layer is closer to said optical attenuating layer and closer to said second portion of said substrate than any additional layer having a refractive index greater than 1.65.

2. The optical attenuation filter according to claim 1, wherein said first multilayer antireflective coating structure includes a first additional layer of a refractive index greater than 1.65, formed on said first buffer layer, a second additional layer of a refractive index less than 1.65, formed on said first additional layer, and a third additional layer of a refractive index greater than 1.65, formed on said second additional layer.

3. The optical attenuation filter according to claim 2, wherein said first multilayer antireflective coating structure further includes a fourth additional layer of a refractive index less than 1.65, formed on said third additional layer.

4. The optical attenuation filter according to claim 3, wherein said fourth additional layer has refractive index less than 1.4.

5. The optical attenuation filter according to claim 3, wherein each of said first buffer layer and said second additional layer has a refractive index less than 1.5, and said fourth additional layer has refractive index less than 1.4.

6. The optical attenuation filter according to claim 3, wherein said fourth additional layer is a metallic fluoride.

7. The optical attenuation filter according to claim 2, wherein said second additional layer has a refractive index less than 1.5.

8. The optical attenuation filter according to claim 1, further comprising an adhesion-promoting layer joining said first buffer layer to said optical attenuating layer and to said second portion of said first surface of said substrate.

9. The optical attenuation filter according to claim 8, wherein said adhesion-promoting layer comprises a material selected from the group consisting of aluminum oxide, chromium, tantalum oxide, nickel oxide, zirconium oxide and combinations thereof.

10. The optical attenuation filter according to claim 1, further including a second multilayer antireflective coating structure formed on said second surface of said substrate, said second multilayer antireflective coating structure including a second buffer layer of a refractive index less than 1.65, and one or more further layers containing at least one layer of a refractive index greater than 1.65, and wherein said second multilayer antireflective coating structure formed on second surface of said substrate has a layer arrangement such that said second buffer layer is closer to said second surface of said substrate layer than any further layer having a refractive index greater than 1.65.

11. The optical attenuation filter according to claim 1, wherein characteristics of said optical attenuating layer and said first multilayer antireflective coating structure are such as to produce a variation in transmission through said filter that is less than one percent over a prescribed low reflectivity wavelength band.

12. The optical attenuation filter according to claim 1, wherein characteristics of said optical attenuating layer and said multilayer antireflective coating structure are such as to produce a variation in transmission through said filter that is less than one-half percent over a low reflectivity wavelength band from 1525 to 1630 nm.

13. The optical attenuation filter according to claim 1, wherein said optical attenuation filter is displaceable in a direction transverse to a path of light incident thereon, so that displacement of said optical attenuation filter along said direction varies the thickness of said optical attenuating layer in said path of said light and thereby varies attenuation of said light passing through said optical attenuation filter.

14. The optical attenuation filter according to claim 1, wherein said optical attenuation filter is displaceable in a direction transverse to a path of light incident thereon over a distance covering said first and second portions of said first surface of said substrate, so that displacement of said optical attenuation filter along said direction over said distance covering said first and second portions of said first surface of said substrate is capable of varying the thickness of said attenuating layer in said path of said light over a range of from 100% to 0%, and producing a corresponding variation in attenuation of said light passing through said optical attenuation filter.

15. The optical attenuation filter according to claim 1, wherein said first buffer layer comprises a material selected from the group consisting of silicon monoxide, silicon dioxide, SiOx (where x is less than 2), aluminum oxide and mixtures thereof.

16. The optical attenuation filter according to claim 1, wherein said optical attenuating layer comprises a material selected from the group consisting of nickel, chromium, tungsten, copper, gold, tantalum, iron and mixtures and combinations thereof.

17. A method of attenuating an optical signal comprising the steps of:
   (a) providing an optical attenuation filter that includes
      a substrate having a first and second surfaces,
      an optical attenuating layer formed on at least a first portion of said first surface of said substrate, wherein said optical attenuating layer has a variation in thickness across at least one dimension of said substrate, and wherein said first surface of said substrate has a second portion thereof, that is adjacent to said first portion of said first surface said substrate and is exclusive of said optical attenuating layer, and
      a first multilayer antireflective coating structure formed on said optical attenuating layer and also on said second portion of said first surface of said substrate, and including a first buffer layer of a refractive index less than 1.65, and one or more additional layers containing at least one layer of a refractive index greater than 1.65, and wherein said first multilayer antireflective coating structure formed on said optical attenuating layer and on said second portion of said first surface of said substrate has a layer arrangement such that said first buffer layer is closer to said optical attenuating layer and closer to said portion of said first surface of said substrate than any additional layer having a refractive index greater than 1.65; and (b) placing said optical attenuation filter provided in step (a) in the path of light to be attenuated.

18. The method according to claim 17, wherein said optical attenuating layer has a variation in thickness across at least one dimension of said substrate, and said optical attenuation filter is displaceable in a direction transverse to a path of light incident thereon, and further including the step of:

(c) displacing said optical attenuation filter along said direction so as to vary the thickness of said optical attenuating layer in said path of said light and thereby vary attenuation of said light passing through said optical attenuation filter.

19. The method according to claim 18, wherein step (c) includes displacing said optical attenuation filter in a direction transverse to said path of light over a distance covering said first and second portions of said first surface of said substrate, so that displacement of said optical attenuation filter along said direction over said distance covering said first and second portions of said first surface of said substrate varies the thickness of said attenuating layer in said path of said light over a range of from 100% to 0%, and produces a corresponding variation in attenuation of said light passing through said optical attenuation filter.

* * * * *